(12) United States Patent
Yamagami

(10) Patent No.: US 7,139,885 B2
(45) Date of Patent: Nov. 21, 2006

(54) METHOD AND APPARATUS FOR MANAGING STORAGE BASED REPLICATION

(75) Inventor: Kenji Yamagami, Los Gatos, CA (US)

(73) Assignee: Hitachi, Ltd., Tokyo (JP)

( * ) Notice: Subject to any disclaimer, the term of this patent is extended or adjusted under 35 U.S.C. 154(b) by 568 days.

(21) Appl. No.: 10/033,646

(22) Filed: Dec. 27, 2001

(65) Prior Publication Data

US 2003/0126388 A1    Jul. 3, 2003

(51) Int. Cl.
G06F 12/16    (2006.01)
G06F 12/00    (2006.01)

(52) U.S. Cl. .................. 711/162; 711/161; 707/204
(58) Field of Classification Search .............. 711/162
See application file for complete search history.

(56) References Cited

U.S. PATENT DOCUMENTS

| 5,459,857 A | 10/1995 | Ludlam et al. |
|---|---|---|
| 5,544,347 A | 8/1996 | Yanai et al. |
| 5,742,792 A | 4/1998 | Yanai et al. |
| 5,745,753 A | 4/1998 | Mosher, Jr. |
| 5,857,208 A | 1/1999 | Ofek |
| 5,870,537 A | 2/1999 | Kern et al. |
| 5,909,540 A | 6/1999 | Carter et al. |
| 5,933,653 A | 8/1999 | Ofek |
| 5,937,414 A | 8/1999 | Souder et al. |
| 5,991,771 A | 11/1999 | Falls et al. |
| 6,073,209 A | 6/2000 | Bergsten |
| 6,101,497 A | 8/2000 | Ofek |
| 6,157,991 A | 12/2000 | Arnon |
| 6,173,377 B1 | 1/2001 | Yanai et al. |
| 6,182,198 B1 * | 1/2001 | Hubis et al. ................... 714/6 |
| 6,189,079 B1 | 2/2001 | Micka et al. |
| 6,202,085 B1 | 3/2001 | Benson et al. |
| 6,260,124 B1 | 7/2001 | Crockett et al. |
| 6,304,980 B1 | 10/2001 | Beardsley et al. |
| 6,324,654 B1 * | 11/2001 | Wahl et al. ..................... 714/6 |
| 6,496,908 B1 * | 12/2002 | Kamvysselis et al. ....... 711/162 |
| 6,631,442 B1 * | 10/2003 | Blumenau .................... 711/112 |
| 2003/0172286 A1 * | 9/2003 | Gotoh et al. ................. 713/193 |

* cited by examiner

*Primary Examiner*—Mano Padmanabhan
*Assistant Examiner*—Midys Rojas
(74) *Attorney, Agent, or Firm*—Sughrue Mion, PLLC; Pavel Pogodin, Esq.

(57) ABSTRACT

The present invention provides techniques for managing storage based replication. Specific embodiments provide the capability to make multiple remote copies of information without the necessity of copying information for each pair, for example. One or more remote mirror pairs can be created for disaster recovery, testing, or other purposes.

19 Claims, 12 Drawing Sheets

Preparing for testing

Fig1. Creating an auxiliary system
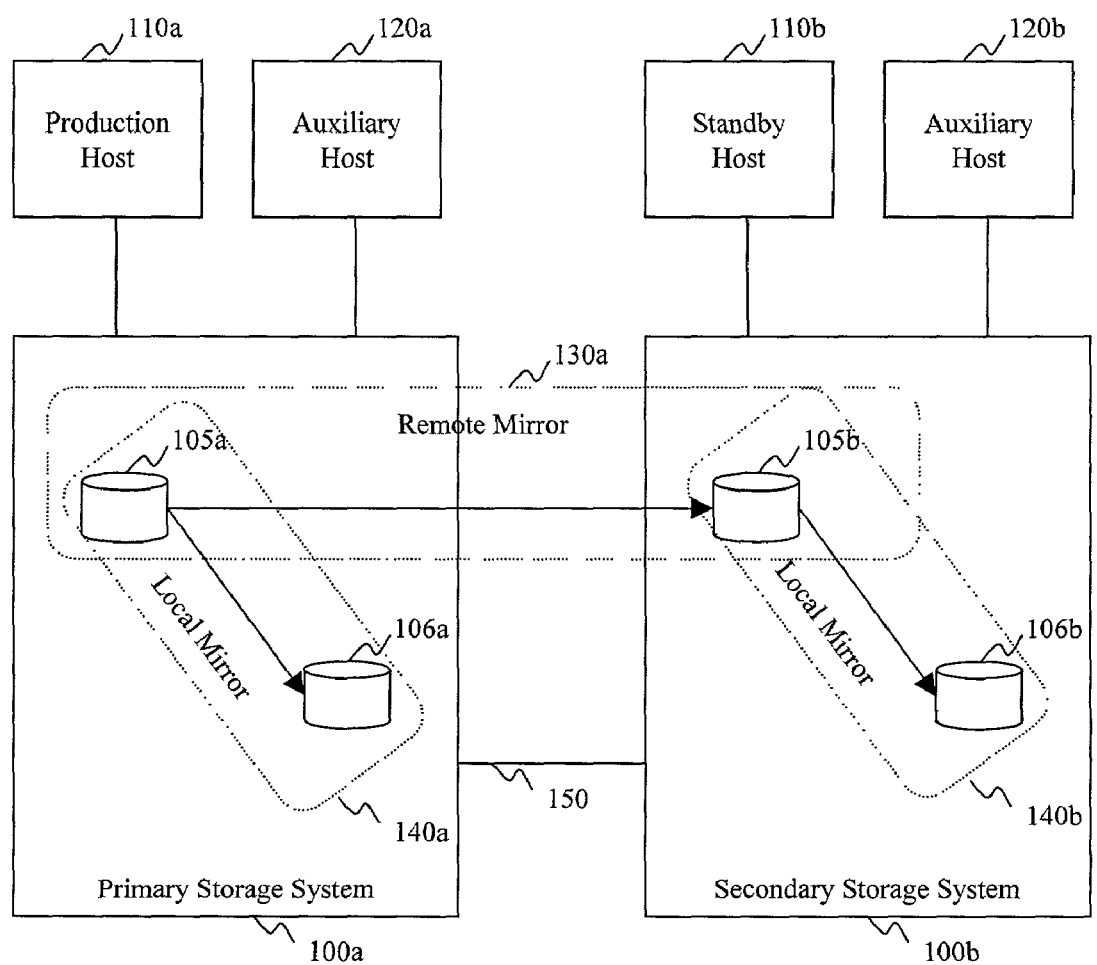

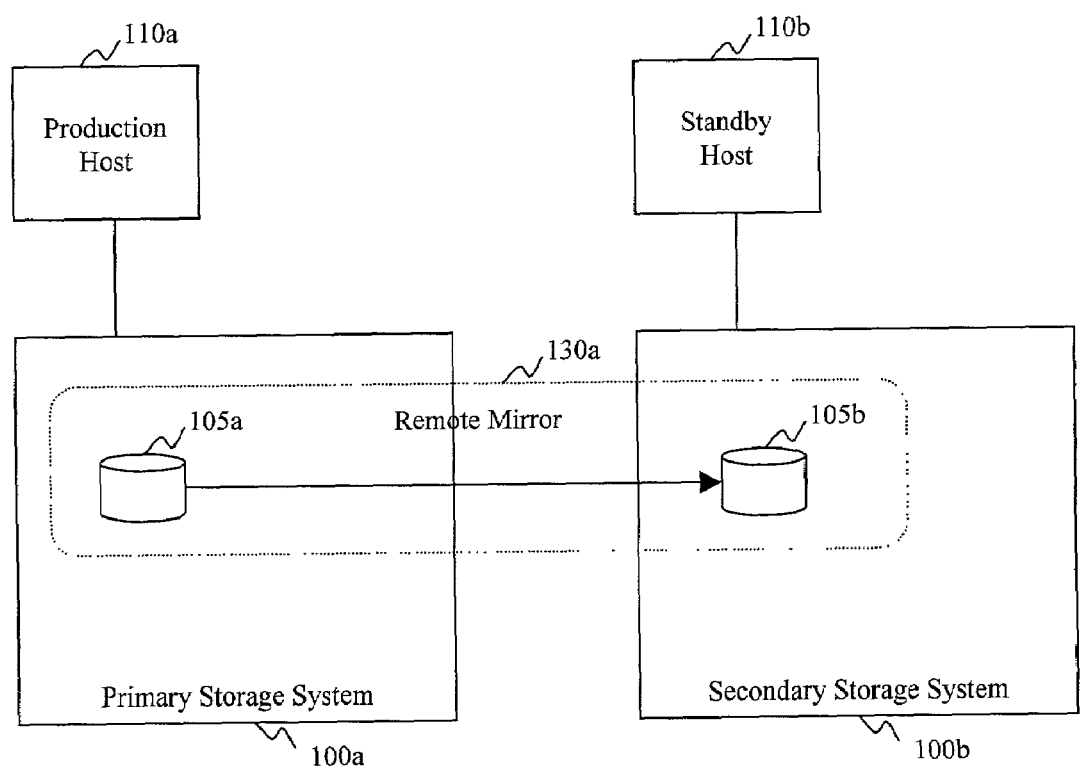
Fig2. System Configuration in daily operation

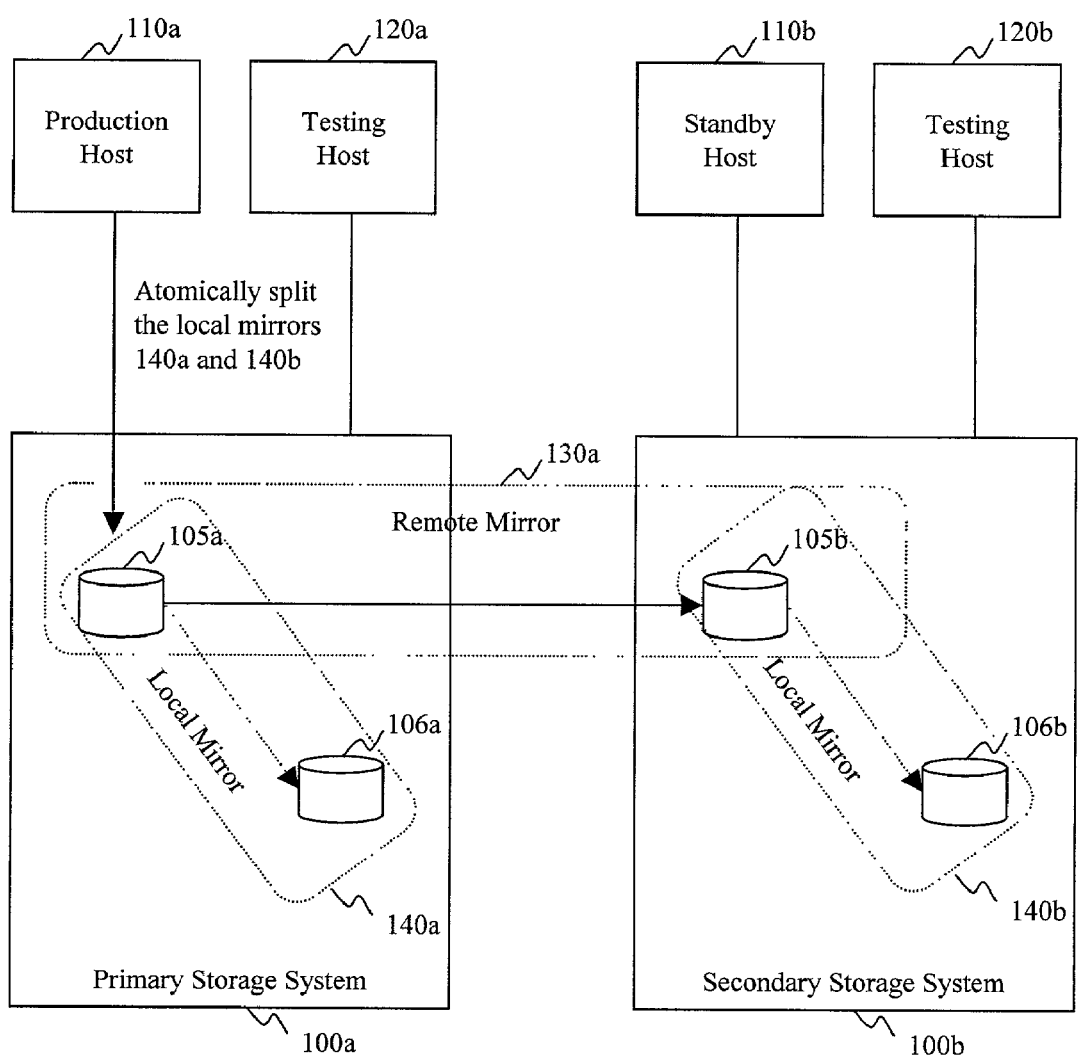
Fig3. Preparing for the auxiliary system

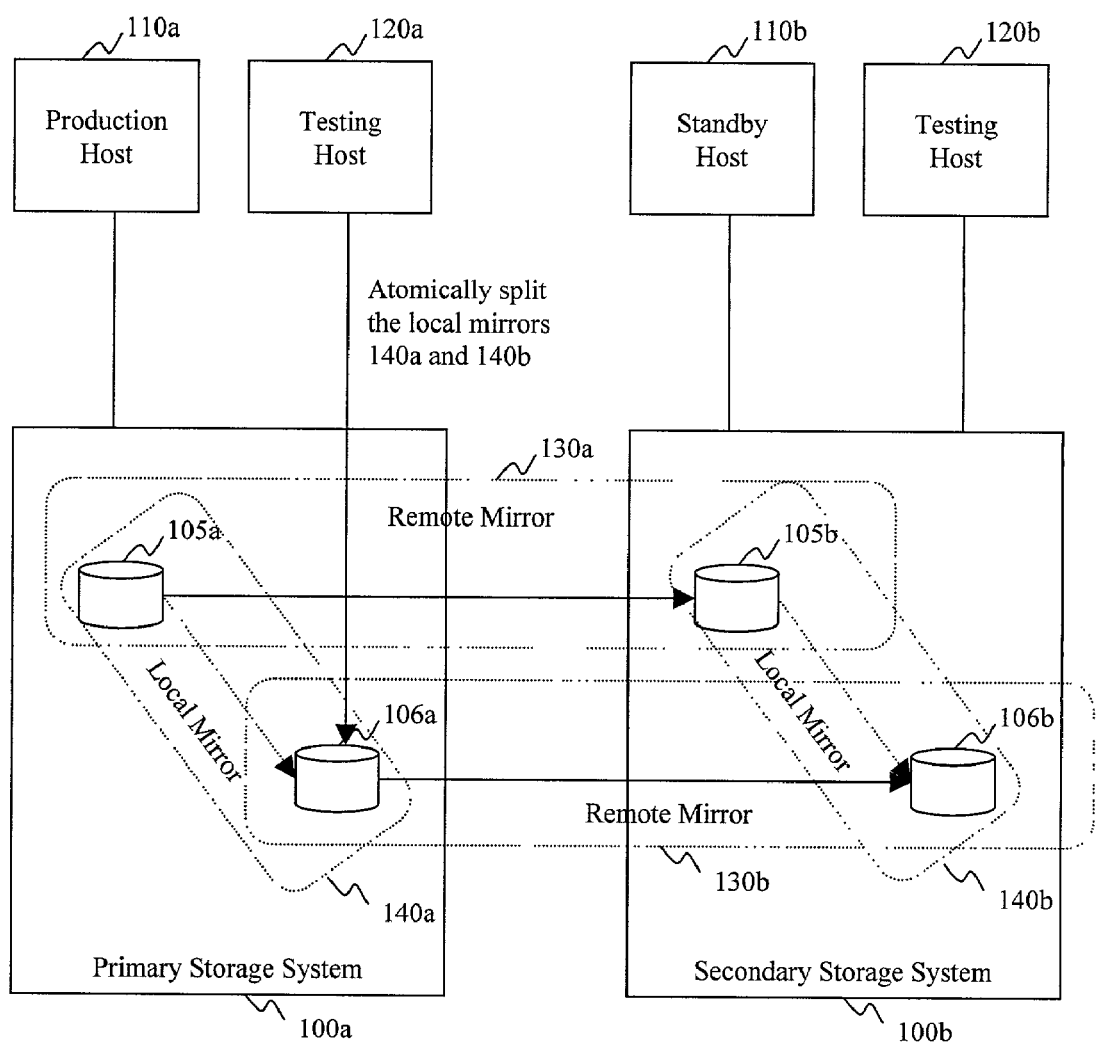
Fig4. Preparing for testing

Fig5 Flow chart for creating auxiliary systems
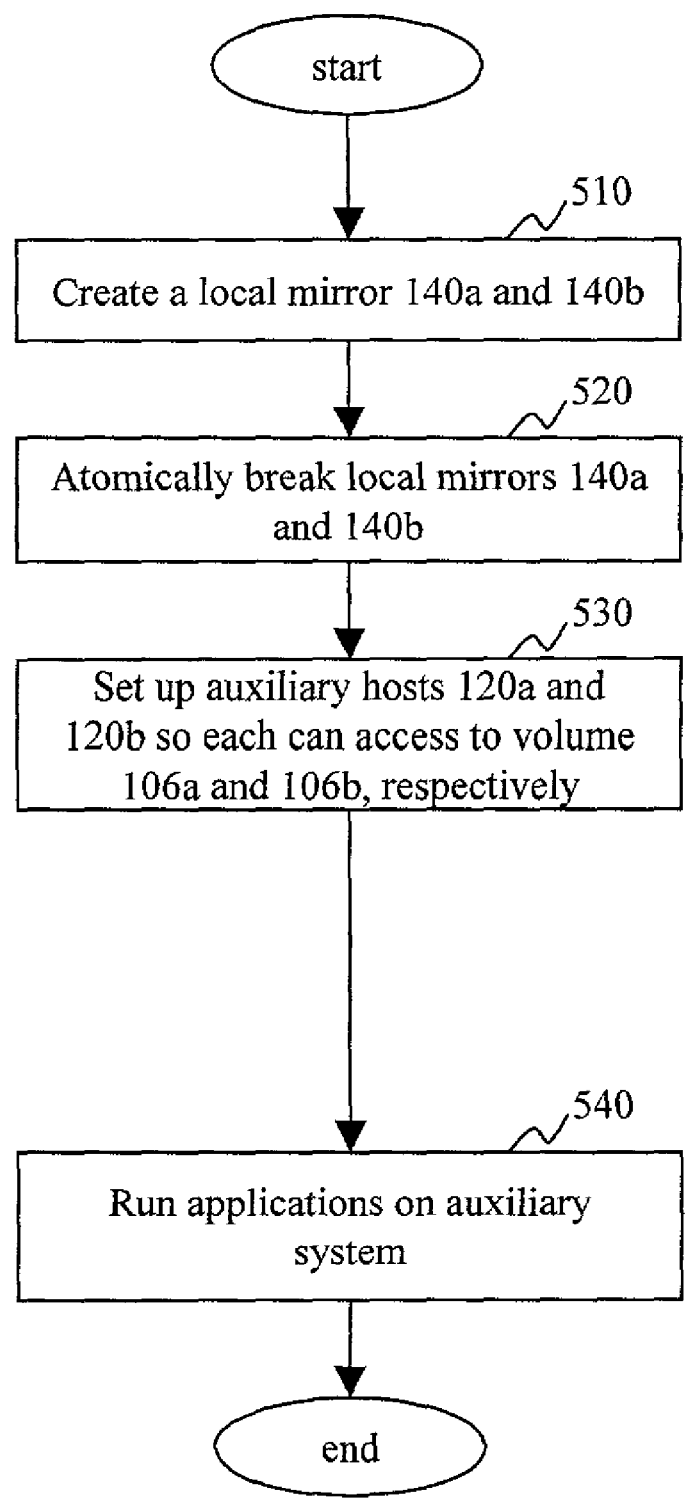

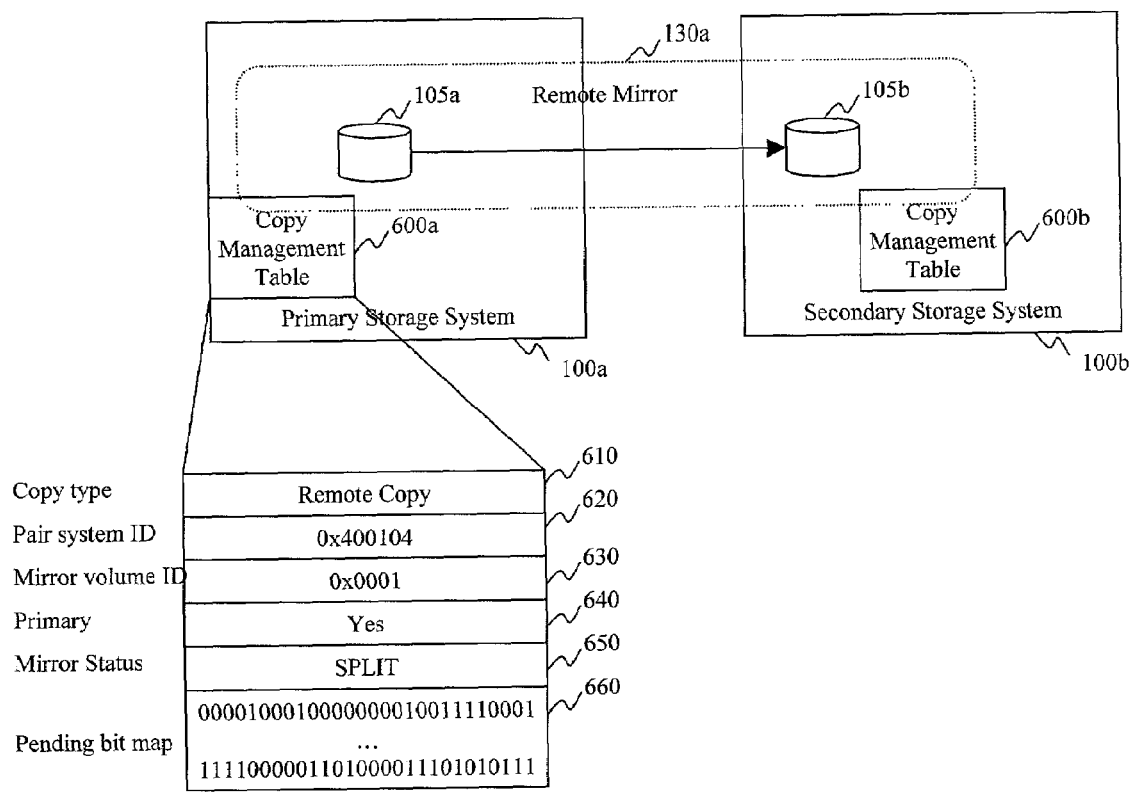
Fig6 Copy Management Table

Fig 7 command format for atomic split of multiple mirrors
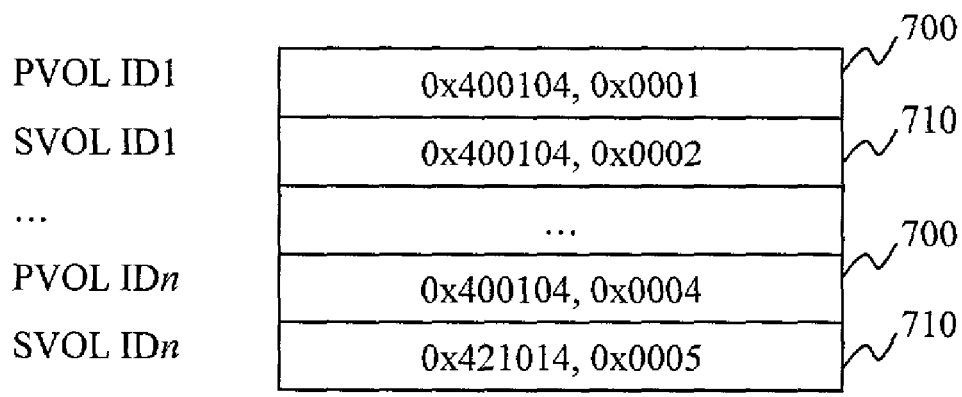

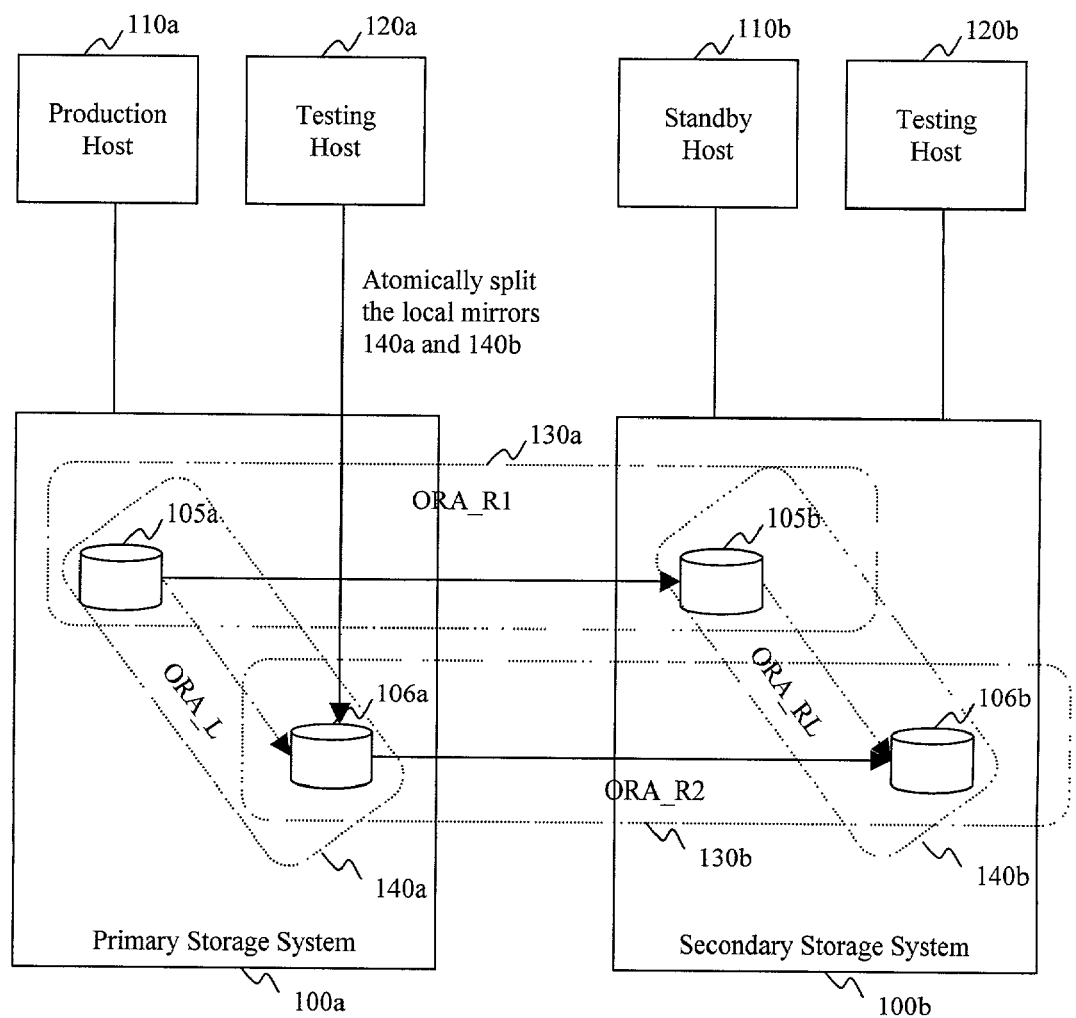
Fig8 Naming mirrors

Fig 9 Atomic Split Command format, using mirror naming
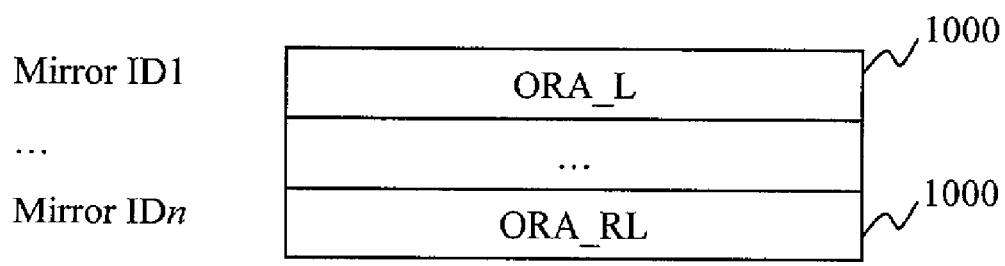

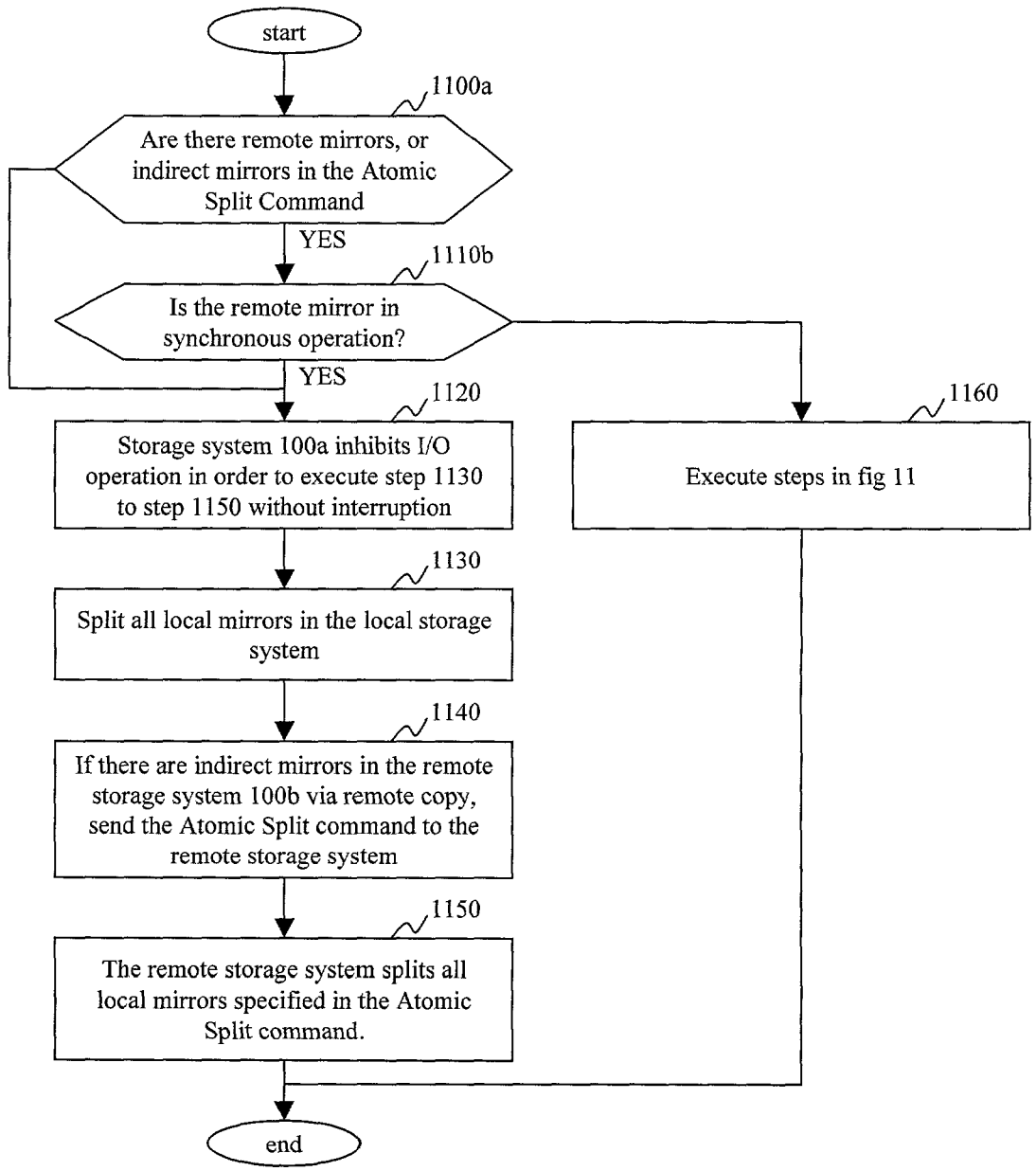
Fig 10 Flowchart for atomically splitting mirrors

Fig 11 Flowchart for atomically splitting mirrors (cont. from Fig10)
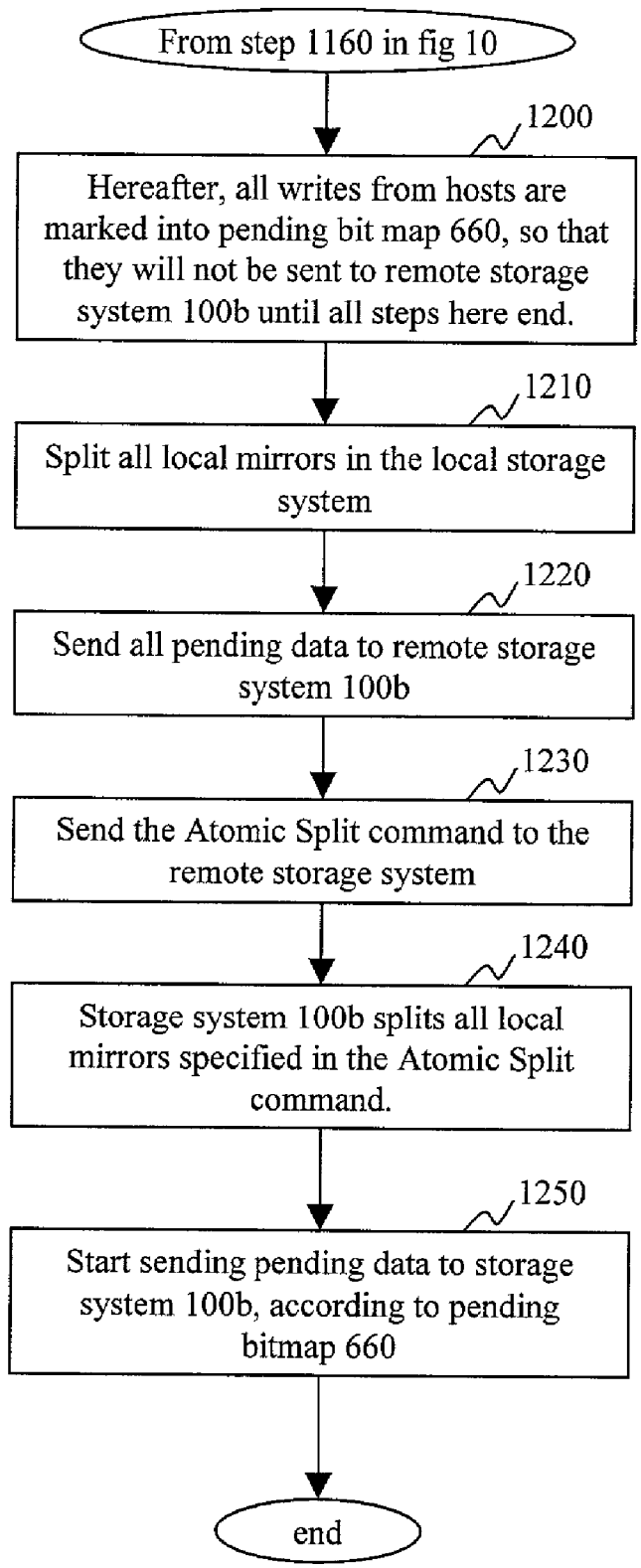

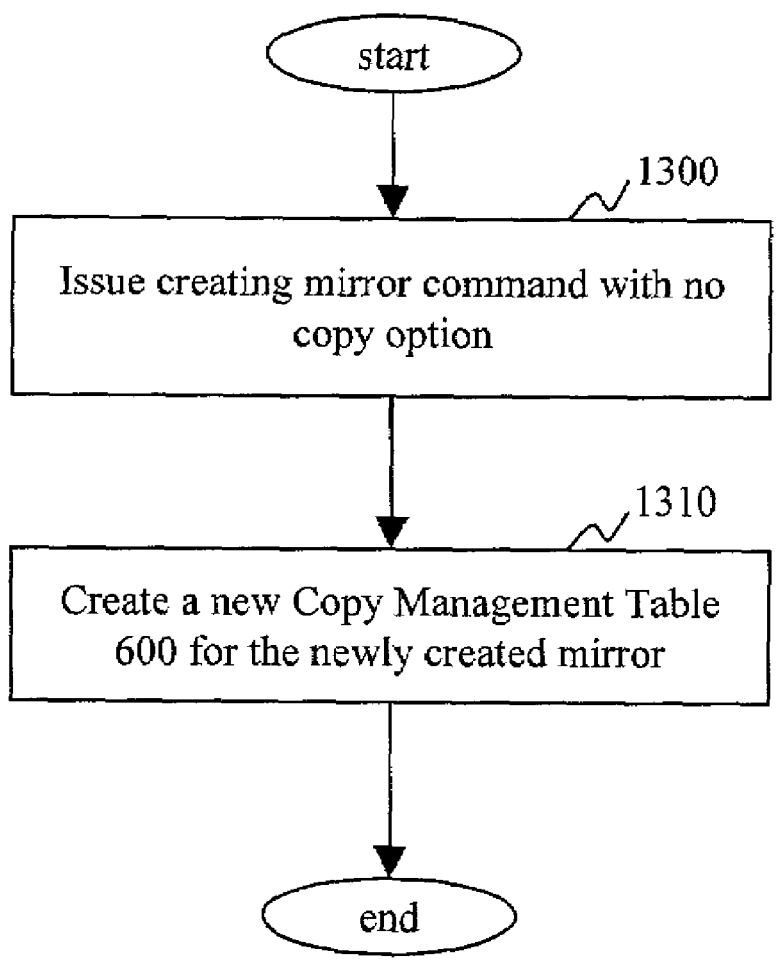
Fig 12 Creating a new mirror

METHOD AND APPARATUS FOR MANAGING STORAGE BASED REPLICATION

BACKGROUND OF THE INVENTION

The present invention relates generally to techniques for storage replication, and in particular to techniques for remote storage replication.

Conventionally, there have been two types of approaches to storage-based replication, local and remote replication. Both technologies mirror files, filesystems, or volumes without using host CPU power. When a host writes data to a volume containing production data (PVOL), the storage system automatically copies the data to a replication volume (SVOL). This mechanism ensures that PVOL and SVOL are identical.

The local replication approaches duplicate volumes within one storage system, so that the PVOLs and SVOLs are in the same storage system. The local replication approaches are typically used for taking backups. When a user by manual means, or a back-up program, splits a mirrored pair, data written from a host is no longer copied to the SVOL. Accordingly, the SVOL now contains a backup of PVOL. To restore the whole volume, the user can re-synchronize PVOL with SVOL. To restore individual files, the user can copy files from SVOL to PVOL through host.

The remote replication duplicates volumes across two or more storage systems. Data is transferred through paths, such as ESCON, Fibre Channel, T3, and/or IP networks, directly connecting two storage systems. The remote replication typically used to recover data from disasters, such as earthquake, flood, fire, and the like. Even if the storage system or the whole data center at the primary site is damaged by a disaster, data is still at the secondary site and businesses can be resumed quickly.

While certain advantages are perceived, opportunities for further improvement exist. For example, according to conventional replication approaches, information must be sent to each SVOL from each PVOL along a particular path. When the path is a high bandwidth path, usage charges can mount. On the other hand, if the path is not of sufficient bandwidth, the copy operations can lag behind.

What is needed are improved techniques for managing storage based replication.

SUMMARY OF THE INVENTION

The present invention provides techniques for managing storage based replication. Specific embodiments provide the capability to make multiple remote copies of information without the necessity of copying information for each pair, for example. One or more remote mirror pairs can be created for disaster recovery, testing, or other purposes.

In specific embodiments, creating a second remote copy system that is a copy of a first remote copy system can be performed by an administrator, who creates a new local mirror for each PVOL and for each SVOL of a remote mirror. Instead of creating new local mirrors, the administrator may elect to use local mirrors, which have been previously created for other purposes, for testing purposes. In preparing the second remote copy system, local mirrors can be atomically broken using an "atomic split" command issued from a host, for example. When the mirrors are atomically suspended, secondary volumes in both a local and remote storage subsystem contain the same data, and thus are identical. Accordingly, a new mirror can be created, which comprises of a local secondary volume and a remote secondary volume, without copying data from the local secondary volume to the remote secondary volume. These two volumes are also local mirrors of a local primary volume and a remote secondary-primary volume, respectively. Once the second mirror pair is created, testing applications or the like, can be started on an auxiliary host using the second remote mirror pair.

According to the method above, there is no need to copy data from primary storage system to the secondary storage system in order to create a second remote copy system. Transferring data between two storage systems usually takes long periods of time and results in increased costs, because of long distances between the storage systems. Although this invention hereafter refers volumes to be replicated, it is not limited to volumes and easily applied to files or filesystems.

In a representative embodiment, the present invention provides a method for making a remote copy between a first storage subsystem and a second storage subsystem, which are connected to each other via a path. The first storage system is connected to a first host. The method comprises providing a first logical volume to the first storage subsystem and a second logical volume to the second storage subsystem. The second logical volume can be a copied logical volume of the first logical volume. The first logical volume and the second logical volume are in sync state. Further, the method includes making a third logical volume in the first storage subsystem. The third logical volume can be a copied logical volume of the first logical volume. The first logical volume and the third logical volume can be in sync state. The method can also include making a fourth logical volume in the second storage subsystem. The fourth logical volume can be a copied logical volume of the second logical volume. The second logical volume and the fourth logical volume are in sync state. Breaking the sync state between the first logical volume and the third logical volume and between the second logical volume and the fourth logical volume based on a command is also part of the method. Further, synchronizing the fourth logical volume with the third logical volume is included in specific embodiments. In a specific embodiment, a plurality of remote copy mirrors formed according to the method described above.

In a specific embodiment, the method further comprises providing a first auxiliary host at the first storage subsystem. The first auxiliary host has permissions to access the third logical volume. Providing a second auxiliary host at the second storage subsystem can also be part of the method. The second auxiliary host has permissions to access the fourth logical volume. The method also includes executing applications using the first auxiliary host, the second auxiliary host, the third logical volume and the fourth logical volume.

In a specific embodiment, executing applications comprises performing data recovery testing. Making a third logical volume in the first storage subsystem comprises storing a test copy of data used by the first host on the third logical volume. Making a fourth logical volume in the second storage subsystem comprises forming a mirror image of data in the third logical volume on the fourth volume. In a specific embodiment, data recovery testing comprises simulating a disaster at the first auxiliary host and testing backup of information from the third logical volume to the fourth logical volume, and recovery there from.

In a specific embodiment, executing applications comprises performing data mining. Making a third logical volume in the first storage subsystem comprises establishing on the third volume a data warehouse having a copy of on line transactions processing (OLTP) data used by the first host. Further, making a fourth logical volume in the second storage subsystem comprises forming a mirror image of data in the third logical volume on the fourth volume. In a specific embodiment, data mining comprises establishing a data warehouse having a copy of on line transaction processing data at the first auxiliary host; performing data analyses on the data warehouse information, and performing backups and/or recovery of the data warehouse information of the third logical volume to the fourth logical volume.

In a specific embodiment, the method can also include determining if the sync state between the first logical volume and the second logical volume is an asynchronous mirror, and if so inhibiting sending of further write data from the first storage subsystem to the second storage subsystem; recording incoming write data at the first storage subsystem; and re-synchronizing the first logical volume and the second logical volume after breaking the sync state between the second logical volume and the fourth logical volume. In a specific embodiment, synchronizing the fourth logical volume with the third logical volume comprises issuing a command to form a mirror with a no copy option; and creating a new copy management storage area for the mirror.

In another representative embodiment, the present invention provides a computer readable storage medium having stored thereon an atomic split command. The atomic split command comprises a primary volume id (PVOL ID) indicating a primary volume (PVOL) and a secondary volume id (SVOL ID) indicating a secondary volume (SVOL). In a select embodiment of the computer readable storage medium, the primary volume id comprises a serial number of a storage system and a volume serial number within the storage system.

In a further representative embodiment, the present invention provides an apparatus comprising a first means for storing data; a second means for storing data, which is remotable from and a copy of content of, the first means for storing data, and is in a sync state with the first means for storing data. The apparatus also includes a third means for storing data, which is co-located with, and a copy of content of, the first means for storing data, and is in a sync state with the first means for storing data. The apparatus further includes a fourth means for storing data, which is co-located with, and a copy of content of, the second means for storing data, and is in a sync state with the second means for storing data. A means for breaking the sync state between the first means for storing data and the third means for storing data and between the second means for storing data and the fourth means for storing data and a means for synchronizing the fourth means for storing data with the third means for storing data after breaking the sync state are also part of the apparatus.

In a specific embodiment, the apparatus further comprises a means for creating an atomic split command. The command comprises an identity of a first means for storing data to serve as a primary volume and an identity of a second means for storing data to serve as a secondary volume.

In a specific embodiment, the apparatus further comprises a means for creating an atomic split command. The command comprises a first remote mirror, $ORA_{13}R1$, comprised of the first means for storing data and the second means for storing data; a second remote mirror, ORA_R2, comprised of the third means for storing data and the fourth means for storing data; a first local mirror, ORA_L, comprised of the first means for storing data and the third means for storing data; and a second local mirror, ORA_RL, comprised of the second means for storing data and the fourth means for storing data.

In a yet further representative embodiment, the present invention provides a method comprising establishing a first remote mirror between a first logical unit in a first storage system and a second logical unit in a second storage system. Establishing a first local mirror between the first logical unit and a third logical unit in the first storage system is also part of the method. As is establishing a second local mirror between the second logical unit and a fourth logical unit in the second storage system. Further, the method includes splitting the first local mirror and the second local mirror; and establishing a second remote mirror between the third logical unit and the fourth logical unit. In a specific embodiment, splitting the first local mirror and the second local mirror comprises determining whether the first remote mirror is asynchronous, and if so, copying all pending information to the second storage system. In a specific embodiment, a plurality of remote copy mirrors formed according to the method described above.

In a specific embodiment, the method also includes using the logical volumes of the first remote mirror for production processing and using the logical volumes of the second remote mirror for testing. In another specific embodiment, the method also includes using the logical volumes of the first remote mirror for on line transaction processing and using the logical volumes of the second remote mirror for data mining.

In a specific embodiment, establishing a second remote mirror between the third logical unit and the fourth logical unit comprises issuing a create mirror command with a no copy option; and creating a new copy management information store for managing mirroring between the third logical unit and the fourth logical unit.

In a still further representative embodiment, the present invention provides a computer program product comprising a computer readable storage medium having stored thereon code for establishing a first remote mirror between a first logical unit in a first storage system and a second logical unit in a second storage system. Code for establishing a first local mirror between the first logical unit and a third logical unit in the first storage system and code for establishing a second local mirror between the second logical unit and a fourth logical unit in the second storage system is also part of the computer program product. Further, the computer program product also includes code for splitting the first local mirror and the second local mirror and code for establishing a second remote mirror between the third logical unit and the fourth logical unit.

Numerous benefits are achieved by way of the present invention over conventional techniques. Specific embodiments according to the present invention provide capabilities to make multiple remotely mirrored pairs of volumes without the need to copy data from a primary storage system to a secondary storage system each time a new mirrored pair is created. Conventional approaches, by contrast, transfer data between two storage systems, which usually takes long periods of time and results in increased costs, because of long distances between the storage systems. Further, some specific embodiments can provide testing systems that use production level data.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 1 illustrates a representative system configuration in a specific embodiment of the present invention.

FIG. 2 illustrates operation of a remote mirror in a specific embodiment of the present invention.

FIG. 3 illustrates a representative operation of creating additional remote mirrors in a specific embodiment of the present invention.

FIG. 4 illustrates a representative testing system comprising a plurality of remote mirrors in a specific embodiment of the present invention.

FIG. 5 illustrates a flowchart of a representative process for creating a second remote mirror in a specific embodiment of the present invention.

FIG. 6 illustrates a representative copy management table in a specific embodiment of the present invention.

FIG. 7 illustrates a representative atomic split command format in a specific embodiment of the present invention.

FIG. 8 illustrates a representative naming convention for mirrors in a specific embodiment of the present invention.

FIG. 9 illustrates a representative atomic split command format using the naming convention illustrated by FIG. 8 in a specific embodiment of the present invention.

FIGS. 10 and 11 illustrate flowcharts of representative processing for atomically splitting mirrors in a specific embodiment of the present invention.

FIG. 12 illustrates a flowchart of a representative process for creating a new mirror using indirect mirror volumes in a specific embodiment of the present invention.

DESCRIPTION OF THE SPECIFIC EMBODIMENTS

The present invention provides techniques for managing storage based replication. Specific embodiments provide the capability to make multiple remote copies of information without the necessity of copying information for each pair, for example. One or more remote mirror pairs can be created for disaster recovery, testing, or other purposes.

Remote copy is becoming an increasingly popular way to establish highly available systems. Sometimes one wants to have a copy of a set of remote copy, which includes both the primary volume (PVOL) and the secondary volume (SVOL). Such copies are used for various different purposes from the original remote copy. For example, disaster recovery testing, decision support systems, and data warehousing are a few of the many example applications in which specific embodiments of the present invention may be used.

Remote mirroring technology, in which two remotely located disk systems are connected by remote links, and a mirror of the disks is kept, each of which is in the local or remote disk system are generally known. The reader is referred to U.S. Pat. Nos. 5,459,857; 5,544,347 and 5,933,653, for example for illustrative examples. However, these approaches lack many of the features and benefits that may be afforded by specific embodiments of the present invention as described herein.

In disaster recovery testing, for example, a rather complicated duplication and recovery processes and employed that draw upon experience and administrator skills. Accordingly, periodic testing of remote replication systems with production data is very important to these types of applications. It is, however, difficult to implement testing systems easily and quickly with production data.

The local disk system copies data on a local disk when pair creation is indicated. When a host updates data on the disk, the local disk system transfers the data to the remote disk system through the remote links. Thus no host operation is required to maintain a mirror of two volumes.

Techniques for transferring data between local and remote disk systems include synchronous mode, semi-synchronous mode, asynchronous mode, or adaptive copy mode replication. With synchronous mode, the local disk system transfers data to the remote disk system before completing a write request from a host. With semi-sync mode, the local disk system completes a write request and then transfers the write data to the remote disk system. Succeeding write requests are not processed until finishing the previous data transfer. With adaptive copy mode, pending data to the remote disk system is stored in a memory and transferred to the remote disk system when the local disk system and/or remote links are available for the copy task.

SYSTEM CONFIGURATION

FIG. 1 illustrates a representative system configuration in a specific embodiment of the present invention. In FIG. 1, a Production host 110a is a host computer on which applications run using production data. An auxiliary host, such as auxiliary host 120a and auxiliary host 120b comprises a host computer on which applications run on a copy of the production data. The applications may include, for example, data mining, data warehousing, decision support systems and disaster recovery testing. Many other applications are also readily apparent to those of ordinary skill in the art based. In some specific embodiments, auxiliary host 120b may be omitted depending on application specific parameters. For example, auxiliary host 120b is especially useful in disaster recovery testing applications. A Standby host 110b is a standby for host 10a. In case of disaster, applications running on host 110a fail over to standby host 110b.

A Primary storage system 100a comprises storage system that has volumes containing production data. Production host 110a and auxiliary host 120a connect to primary storage system 100a, so that the hosts can access volumes within the storage system. A Secondary storage system 100b, comprises the storage system that has volumes containing copies of production data. Standby host 110b and auxiliary host 120b connect to the secondary storage system 100b, so that the hosts can access volumes within the storage system.

A Remote mirror 130a comprises a set of volumes remotely mirrored. A remote mirror 130a contains a primary volume (PVOL) 105a, which is in the primary storage system 100a, and a secondary volume (SVOL) 105b, which is in the secondary storage system 100b. When the remote mirror is established, the primary volume 105a and the secondary volume 105b are in a sync state, such that the contents of these two volumes are identical unless the mirror is split manually or unexpectedly by a failure.

A Local mirror 140a comprises a set of volumes locally mirrored, i.e., within a single storage system. A local mirror 140a comprises a primary volume (PVOL) and a secondary volume (SVOL). For example, as illustrated by FIG. 4, volumes 105a and 106a are a primary volume (PVOL) and a secondary volume (SVOL), respectively. Both primary and secondary volumes of a local mirror 140a are in the same storage system 100a, while ones of a remote mirror 130a are in different storage systems 100a and 100b, respectively. Note that, in specific embodiments, a remote mirror 130a and a local mirror 140b may be used in conjunction with one another. In the example of FIG. 1, volume 105b is the secondary volume (SVOL) of remote mirror 130a, as well as the primary volume (PVOL) of local mirror 140b. Accordingly, volume 105b is sometimes referred to as a Secondary and Primary Volume (SPVOL).

A Storage interconnect path 150 provides a connection between primary storage system 100a and secondary storage system 100b. Write data to volume 105a is sent though storage interconnection path 150, and written to remote copy secondary volume 105b. This mechanism keeps these two volumes identical.

FIG. 2 illustrates a representative operation of a remote mirror in a specific embodiment of the present invention. As illustrated by the representative example in FIG. 2, a remote mirror 130 may be established between a first logical volume, called the primary volume (PVOL) 105a in the primary or local storage system 100a, and a second logical volume, called the secondary volume (SVOL) 105b in the secondary or remote storage system 100b. A production host 110a connected with the primary storage system 100a writes production level data to volume 105a and reads data there from. Remote mirror 130 may be established to make a continuous copy of the data on the primary volume 105a to the secondary volume 105b for disaster recovery purposes, and the like, for example. A standby host 110b connected to the secondary storage system 100b in order to act as a backup, for example, by serving as a fail over in case a disaster strikes production host 110a.

FIG. 3 illustrates a representative operation of creating additional remote mirrors in a specific embodiment of the present invention. As illustrated by the representative example in FIG. 3, to create a second remote copy system that is a copy of remote mirror 130a, an administrator newly creates a local mirror for each PVOL and for each SVOL of the remote mirror 130a. In FIG. 3, the administrator establishes a local mirror 140a and a local mirror 140b in the primary storage system 100a and the secondary storage system 100b, respectively. Instead of creating new local mirrors, the administrator may use local mirrors that have already been created for other purposes in order to perform testing.

In order to prepare for the second remote copy system, local mirrors 140a and 140b are atomically broken by an "atomic split" command issued from a host, for example. When the mirrors are atomically split, the secondary volumes (SVOLs) 106a and 106b contain the same data, and thus are identical.

FIG. 4 illustrates a representative testing system comprising a plurality of remote mirrors in a specific embodiment of the present invention. As illustrated in FIG. 4, volumes 105a and 106a are primary volume (PVOL) and secondary volume (SVOL), respectively. Next, a new mirror 130b, which comprises of volumes 106a and 106b, is created without copying data from volume 106a to volume 106b. These two volumes are also local mirrors of volume 105a and 105b, respectively. The application for testing may be started on the testing host 120a using volume 106a. Now the second remote copy system 130b may be used.

According to the method above, there is no need to copy data from primary storage system 100a to secondary storage system 100b, in order to create a second remote copy system 130b. Transferring data between two storage systems 100a and 100b usually requires expenditure of time and cost, because of the long distance between the storage systems 100a and 100b.

FIG. 5 illustrates a flowchart of a representative process for creating a second remote mirror in a specific embodiment of the present invention. The embodiment illustrated by FIG. 5 begins with a first remote mirror 130a already in place, which is the configuration illustrated by FIG. 2. As illustrated by FIG. 5 creating a second remote mirror comprises a variety of steps.

In a step 510, create a local mirrors 140a and 140b, which are located in primary storage system 100a and secondary storage system 100b, respectively, as illustrated by FIG. 1. When creating a local mirror, such as local mirrors 140a and 140b, all data on volume 105a is copied to volume 106a in the primary storage system 100a and the data on volume 105b is copied to volume 106b in the secondary storage system 100b. Accordingly, the volumes 105a and 106a, and 105b and 106b contain the same data after such processing. In a specific embodiment, one may use mirrors that have already been created.

In a step 520, atomically break the two local mirrors 140a and 140b. After the two mirrors are broken atomically, volumes 106a and 106b will still contain the same data.

In a step 530, if desired, set up auxiliary hosts 120a and 120b, so that these hosts have access to volumes 106a and 106b, respectively. This operation includes defining a path to the volume 106a from host 120a, and to volume 106b from host 120b. Further, step 530 comprises importing volume group is performed if a logical volume manager is used, and mounting a file system.

In a step 540, run applications on auxiliary host 120a.

FIG. 6 illustrates a representative copy management table in a specific embodiment of the present invention. In an example embodiment, both local and remote mirrored pairs comprise a copy of copy management table 600, as illustrated by FIG. 6, for each volume. Both primary volume (PVOL) and secondary volume (SVOL) of a mirrored pair have copy management table 600. For example in FIG. 6, volume 105a and 105b of remote mirror 130a have copy management table 600. Using this table, a storage system can break two local mirrors atomically in accordance with techniques of the present invention.

Copy management table 600 comprises a Copy Type 610 that stores either 'Remote Copy' or 'Local Copy', depending on the type of copy. A Pair System ID 620 contains the ID of the storage system that has the paired volume. For example, in the copy management table of volume 105a, a pair system ID 620 contains the ID of secondary storage system 100b. Note that each storage system has the unique ID, which can be the serial number of the storage system, or the like.

A Mirror Volume ID 630 contains the ID of the mirror volume. For example, in the copy management table of primary volume 105a, the mirror volume ID 630 contains the ID of secondary volume 105b. This ID may be the volume serial number within the storage system, or the like. A Primary 640 contains 'YES' if the volume is a primary volume (PVOL) or otherwise a 'NO' if not. For example, Primary 640 for volume 105a shows 'YES', while that of volume 105b shows 'No'.

A Mirror status 650 shows a status of the mirror. In a specific embodiment, four status are defined, including COPY, DUPLEX, SPLIT and SIMPLEX. Simplex status indicates that the volume is not mirrored. Copy status indicates that the volume is mirrored, and data copy is in progress. Duplex status indicates that the volume is mirrored, and two volumes are identical. A split status indicates that the volume is mirrored, but the mirror is temporarily suspended. In split status, all updates to the volume are recorded in the Pending Bit Map 660, so that only modified data is copied when re-synchronizing the mirror.

A Pending bitmap 660 shows if there is pending data that is written on the volume, but not on the paired volume. Each bit corresponds to a portion of a volume, e.g. 8K bytes, in one embodiment. When data is written to blocks on the volume during the split status, the bits in the pending bitmap 660 associated with the blocks are set.

FIG. 7 illustrates a representative atomic split command format in a specific embodiment of the present invention. Using an atomic split command, such as that illustrated by FIG. 7, an administrator can atomically split multiple mirrors. This means the mirrors contain the exact same contents, provided that the mirrors were created having the same primary volume (PVOL). FIG. 7 illustrates a representative atomic split command having a primary volume id (PVOL ID) 700, which indicates an identification of the primary volume (PVOL). The primary volume id (PVOL ID) 700 includes a serial number of storage system 100a and a volume serial number corresponding to the primary volume (PVOL) within the storage system 100a. A secondary volume id (SVOL ID) 710 indicates an identification of the secondary volume (SVOL). The secondary volume id (SVOL ID) 710 includes a serial number of storage system 100a and a volume serial number corresponding to the secondary volume (SVOL) within the storage system 100b. A set of PVOL IDi and SVOL IDi identifies a mirror. There may be two or more sets of PVOL ID700 and SVOL ID700 if the administrator splits two or more mirrors.

FIG. 8 illustrates a representative naming convention for mirrors in a specific embodiment of the present invention. Sometimes a mirror or a group of mirrors is named in order for the administrator to more easily manage mirrors. For example, as illustrated in FIG. 8, each local and remote mirrors may be named as follows.

ORA_R1 is a remote mirror 130a, which is comprised of volume 105a and volume 105b.

ORA_R2 is a remote mirror 130b, which is comprised of volume 106a and volume 106b.

ORA_L is a local mirror 140a within storage system 100a, which is comprised of volume 105a and 106a, and ORA_RL is a local mirror 140b within storage system 100b, which is comprised of volume 105b and 106b.

It is noteworthy that, the naming convention illustrated by FIG. 8 is merely for convenience of the administrator, and is not intended to limit the present invention in any way, specifically, it is not intended to limit mirrors to those that contain only one PVOL and one SVOL, as a name may be defined for a group of mirrors, as well. If this naming convention is used, a representative atomic split command format includes these names, as shown in FIG. 9.

FIG. 9 illustrates a representative atomic split command format using the naming convention illustrated by FIG. 8 in a specific embodiment of the present invention. As illustrated by FIG. 9, an atomic split command using the naming convention of FIG. 8 includes a mirror ID 1000, which contains the name of a mirror to be split atomically. The atomic split command will split two mirrors, ORA_L and ORA_RL, as indicated by mirror ID 1000.

FIGS. 10 and 11 illustrate flowcharts of representative processing for atomically splitting mirrors in a specific embodiment of the present invention. As illustrated by FIG. 10 atomically splitting mirrors comprises a variety of steps.

In a step 1100a, the storage system 100a checks if there is a remote mirror, or indirect mirrors, specified in the atomic split command as described in FIGS. 7 through 9. An indirect mirror is a mirror that has a volume in between two mirrored volumes. For example in FIG. 8, volume 105a and volume 106b are an indirect mirror, since volume 105b is in between volume 105a and volume 106b.

In a step 1110b, if there is a remote mirror or an indirect mirror, the storage system 100a checks if the remote mirror is using synchronous mode operation or asynchronous mode operation. Steps to atomically split mirrors are different depending on whether synchronous or asynchronous mode operation is used. In specific embodiments employing synchronous remote copy operation, when a host 110a writes data on a volume 105a, the storage system 100a first copies the write data to the secondary storage system 100b, and then notifies the host 110a of write command completion. In specific embodiments in which asynchronous remote copy operation is used, storage system 100a just marks the data to be copied later (pending data), and then notifies the host 110a of write command completion. The pending data is copied to the secondary storage system 100b while the storage system 100a is idle.

In a step 1120, the storage system 100a inhibits I/O requests from hosts 110a and 120a, so that steps 1130 to 1150 can be executed in an uninterrupted series of operations.

In a step 1130, the storage system 100a splits all local mirrors that are specified by the atomic split command, within storage system 100a.

In a step 1140, if indirect mirrors via remote copy are specified by the atomic split command, then the storage system 100a sends the atomic split command to the storage system 10b. Volume 105a and 106b in FIG. 8 are an example of an indirect mirror via remote copy, because volume 105b lies in between volume 105a and volume 106b.

In a step 1150, when the secondary storage system 100b receives the atomic split command from the primary storage system 100a, the secondary storage system 100b splits all local mirrors within the storage system. After completing the operation, it notifies the storage system 100a of command completion.

In a step 1160, if at step 1110, it is determined that the remote copy is the asynchronous mode, then storage systems execute the steps written in FIG. 11 in a specific embodiment.

As illustrated by FIG. 11 atomically splitting mirrors in asynchronous mode comprises a variety of steps.

In a step 1200, once the atomic split command is in progress, write data arriving after step 1200 is not copied to mirrored volumes specified by the atomic split command until step 1240 completes. Accordingly, write requests arrived after step 1200 are marked in the Pending Bitmap 660 as pending data, so that the write data of the write requests will not be sent until split processing is complete.

In a step 1210, the storage system 100a splits all local mirrors specified by the atomic split command.

In a step 1220, since the remote copy operation is asynchronous, the storage system 100a may have pending data, which is to be copied to the secondary storage system 100b. Such data is copied to the secondary storage system 100b at this step because this data arrived before the atomic split command's arrival. At step 1220, the primary storage system 100a sends all such pending data to the secondary storage system 100b.

In a step 1230, the primary storage system 100a now sends the atomic split command to the secondary storage system 100b, in order to split indirect mirrors within the secondary storage system 100b.

In a step 1240, the secondary storage system 100b splits all local mirrors specified by the atomic split command.

In a step 1250, the primary storage system 100a now resumes the copy operation suspended at step 1200. Based upon the Pending Bitmap 660, all pending data is copied to the secondary storage system 100b. It is noteworthy that, when sending the atomic split command to the secondary storage system 100b as described in step 1140 and step 1230, there are a number of ways to send the atomic split command in various specific embodiments. In one specific embodiment, the atomic split command is sent directly from the primary storage system 100a to the secondary storage system 100b through the storage interconnection path 150. In another specific embodiment, the atomic split command may be sent through a network connecting production host 110a and standby host 110b. In this case, a host agent program running on the two hosts 110a and 110b communicate with each other.

With the method described above, all mirrors specified by the atomic split command are split atomically, and thus all secondary volumes (SVOLs) of the mirrors are identical.

FIG. 12 illustrates a flowchart of a representative process for creating a new mirror using indirect mirror volumes in a specific embodiment of the present invention. A new mirror can be created using mirror volumes created from a mirror of volumes split by the atomic split command. Since the secondary volumes (SVOLs) created by operation of the atomic split command contain the same data, it is not necessary to actually copy data from a primary volume (PVOL) to a secondary volume (SVOL) in order to create a new mirror. In example of FIG. 8, a new mirrored pair can be created using volume 106a and volume 106b, without having to copy data from volume 106a to volume 106b. As illustrated by FIG. 12, creating new mirror pairs involves the following steps:

In a step 1300, the administrator issues the mirror create command with a no copy option.

In a step 1310, the primary storage system 100a and the secondary storage system 100b create a copy management table 600 for mirrors specified by the command. The Copy Management Table 600 includes information such as:

A Copy Type 610, that contains either "Remote Copy" or "Local Copy" depending on whether the mirrored volume, specified in the mirror create command, is located in the secondary storage system 100b or the primary storage system 100a.

A Pair System ID 620 contains a paired storage system ID. If it's a local copy, the pair system ID 620 contains the ID of the storage system within which the two volumes of the mirror reside. For example, FIG. 8 illustrates a first remote mirror 130a and a second remote mirror 130b, formed from volume 106a and volume 106b in the primary storage system 100a and the secondary storage system 100b, respectively. A copy management table 600 for volume 106a, or volume 106b, contains an ID of secondary storage system 100b, or primary storage system 100a, respectively, in the Pair System ID 620.

A Mirror Volume ID 630 contains a mirrored volume ID. In the example of FIG. 8, for the remote mirror 130b, copy management table 600 of volume 106a, or volume 106b, contains the mirror volume ID of volume 106b, or volume 106a, respectively, in the Mirror Volume ID 630.

A Mirror Status 640 contains PAIR, which means two volumes are identical.

A Pending Bitmap 650 will be all zeros, which means no pending data exists.

The preceding has been a description of the preferred embodiment of the invention. It will be appreciated that deviations and modifications can be made without departing from the scope of the invention, which is defined by the appended claims.

What is claimed is:

1. A method for making a remote copy between a first storage subsystem and a second storage subsystem which are connected to each other via a path, the first storage system connected to a first host, the method comprising:

providing a first logical volume to the first storage subsystem and a second logical volume to the second storage subsystem;

copying the contents of the first logical volume to the second logical volume, the first logical volume and the second logical volume being in sync state;

making a third logical volume in the first storage subsystem and copying first data from the first logical volume to the third logical volume, the first logical volume and the third logical volume being in sync state;

making a fourth logical volume in the second storage subsystem and copying second data from the second logical volume to the fourth logical volume, the second logical volume and the fourth logical volume being in sync state, wherein the copying of the second data is performed after the copying the contents of the first logical volume to the second logical volume;

after the copying of the first data from the first logical volume to the third logical volume, breaking the sync state between the first logical volume and the third logical volume;

after copying of the second data from the second logical volume to the fourth logical volume breaking the sync state between the second logical volume and the fourth logical volume based on a command;

after the copying of the first data from the first logical volume to the third logical volume and after copying of the second data from the second logical volume to the fourth logical volume, establishing a synchronization link between the fourth logical volume and the third logical volume;

coupling a first auxiliary host to the third logical volume; and enabling the first auxiliary host to perform operations on the third logical volume while the first host continues operations on the first logical volume and while the first logical volume and second logical volume continue in sync state.

2. The method of claim 1, further comprising:

providing a second auxiliary host at the second storage subsystem, the second auxiliary host having permissions to access the fourth logical volume; and executing applications using the first auxiliary host, the second auxiliary host, the third logical volume and the fourth logical volume.

3. The method of claim 2, wherein executing applications comprises performing data recovery testing storing a test copy of data used by the first host on the third logical volume, and forming a mirror image of data in the third logical volume on the fourth volume.

4. The method of claim 3, wherein data recovery testing comprises:

simulating a disaster at the first auxiliary host; and testing backup of information from the third logical volume to the fourth logical volume, and recovery therefrom.

5. The method of claim 2, wherein executing applications comprises performing data mining, establishing on the third volume a data warehouse having a copy of on line transactions processing (OLTP) data used by the first host, and forming a mirror image of data in the third logical volume on the fourth volume.

6. The method of claim 5, wherein data mining comprises:

establishing a data warehouse having a copy of on line transaction processing data at the first auxiliary host;

performing data analyses on the data warehouse information, and performing backups and/or recovery of the data warehouse information of the third logical volume to the fourth logical volume.

7. The method of claim 1, further comprising:

determining if the sync state between the first logical volume and the second logical volume is an asynchronous mirror, and if so:

inhibiting sending of further write data from the first storage subsystem to the second storage subsystem;

recording incoming write data at the first storage subsystem; and re-synchronizing the first logical volume and the second logical volume after breaking the sync state between the second logical volume and the fourth logical volume.

8. The method of claim 1, wherein synchronizing the fourth logical volume with the third logical volume comprises:

issuing a command to form a mirror with a no copy option; and creating a new copy management storage area for the mirror.

9. A plurality of remote copy mirrors formed according to the method of claim 1.

10. An apparatus, comprising:

a first means for storing data;

a first host coupled to the first means for storing data;

a second means for storing data, being remotable from and a copy of content of the first means for storing data, and being in a sync state with the first means for storing data;

a third means for storing data, co-located with and a copy of content of the first means for storing data, and being in a sync state with the first means for storing data;

a fourth means for storing data, co-located with and a copy of content of the second means for storing data, and being in a sync state with the second means for storing data, wherein the sync state between the second means for storing data and the fourth means for storing data is established after establishing of the sync state between the first means for storing data and the second means for storing data;

a means for breaking the sync state between the first means for storing data and the third means for storing data after establishing the sync state between the first means for storing data and the third means for storing data and for breaking the sync state between the second means for storing data and the fourth means for storing data after establishing the sync state between the first means for storing data and the third means for storing data;

a means for synchronizing the fourth means for storing data with the third means for storing data after copying of content of the first means for storing data and the second means for storing data and breaking the sync state; and means for coupling a first auxiliary host to the third means for storing data; and means for enabling the first auxiliary host to perform operations on the third means for storing data while the first host continues operations on the first means for storing data and while the first means for storing data and second means for storing data continue in sync state.

11. The apparatus of claim 10, further comprising:

a means for creating an atomic split command, the command comprising:

an identity of a first means for storing data to serve as a primary volume; and an identity of a second means for storing data to serve as a secondary volume.

12. The apparatus of claim 10, further comprising:

a means for creating an atomic split command, the command comprising:

a first remote mirror, ORA_R1, comprised of the first means for storing data and the second means for storing data;

a second remote mirror, ORA_R2, comprised of the third means for storing data and the fourth means for storing data;

a first local mirror, ORA_L, comprised of the first means for storing data and the third means for storing data; and a second local mirror, ORA_RL, comprised of the second means for storing data and the fourth means for storing data.

13. A method, comprising:

establishing a first remote mirror between a first logical unit in a first storage system and a second logical unit in a second storage system, the second storage system being remotable from the first storage system;

enabling a first host to perform operations on the first logical unit;

establishing a first local mirror between the first logical unit and a third logical unit in the first storage system;

establishing a second local mirror between the second logical unit and a fourth logical unit in the second storage system, wherein the second local mirror is established after establishing of the first remote mirror;

after establishing the first local mirror and the second local mirror, splitting the first local mirror and die second local mirror in response to a spilt command;

after establishing the first local mirror and the second local mirror, establishing a second remote mirror between the third logical unit and the fourth logical unit; and coupling a first auxiliary host to the third logical unit; and enabling the first auxiliary host to perform operations on the third logical unit while the first host continues operations on the first logical unit and while the first remote mirror remains established.

14. The method of claim 13, wherein using the logical volumes of the first remote mirror for production processing; and using the logical volumes of the second remote mirror for testing.

15. The method of claim 13, wherein using the logical volumes of the first remote mirror for on line transaction processing; and using the logical volumes of the second remote mirror for data mining.

16. The method of claim 13, wherein establishing a second remote mirror between the third logical unit and the fourth logical unit comprises:
   issuing a create mirror command with a no copy option; and
   creating a new copy management information store for managing mirroring between the third logical unit and the fourth logical unit.

17. The method of claim 13, wherein splitting further comprises:
   determining whether the first remote mirror is asynchronous, and if so;
   copying all pending information to the second storage system.

18. A plurality of remote copy mirrors formed according to the method of claim 13.

19. A computer program product, comprising:
   code for establishing a first remote mirror between a first logical unit in a first storage system and a second logical unit in a second storage system, the second storage system being remotable from the first storage system;
   code for enabling a first host to perform operations on the first logical unit;
   code for establishing a first local mirror between the first logical unit and a third logical unit in the first storage system;
   code for establishing a second local mirror between the second logical unit and a fourth logical unit in the second storage system, wherein the second local mirror is established after establishing of the first remote mirror;
   code for splitting the first local mirror and the second local mirror in response to a split command, after establishing the first local mirror and the second local mirror;
   code for establishing a second remote mirror between the third logical unit and the fourth logical unit, after establishing the first local mirror and the second local mirror;
   code for coupling a first auxiliary host to the third logical unit;
   code for enabling the first auxiliary host to perform operations on the third logical unit while the first host continues operations on the first logical unit and while the first remote mirror remains established; and
   a computer readable storage medium for holding the codes.

* * * * *